United States Patent Office 3,743,693
Patented July 3, 1973

3,743,693
PREPARATION OF MATTE-SURFACED STYRENE POLYMER FILM
Cleown A. Leatherman, Shepherd, Isabella County, Mich., assignor to The Dow Chemical Company, Midland, Mich.
No Drawing. Filed May 6, 1971, Ser. No. 140,957
Int. Cl. B29c 25/00
U.S. Cl. 264—340                    8 Claims

ABSTRACT OF THE DISCLOSURE

Styrene polymer film is provided with a matte surface by exposing the film to an azeotropic solvent vapor at a temperature sufficient to cause visual etching by the formation of a plurality of hollow cells and fissures on at least one surface without stress cracking of the film.

---

Frequently it is desirable to provide styrene polymer film and sheet with a matte surface to thereby provide an opaque or translucent finish. Frequently such a matting treatment gives a styrene polymer film a paper-like appearance and alters the surface in such a manner that it is more receptive to dyes, inks and the like. British patent specification 440,926 describes the solvent etching of a polystyrene by contacting the surface with a solvent such as acetone. Other related patents are Canadian Pat. 574,759 and British Pat. 994,094. Plastic surfaces have been roughened by sand blasting or other abrasive means. Two U.S. patents directed to the surface treatment of alkenyl aromatic resinous or styrene polymer films are U.S. 3,027,275 and 3,311,497. Employing the processes of the two hereinbefore cited U.S. patents, polystyrene and other alkenyl aromatic resinous films are easily converted from a normally shiny-surfaced appearance to a matte surfaced film having a surface which appears very similar to that of conventional writing paper when viewed by the naked eye. Other surface treatments have been employed for the preparation of paper-like plastic film. Such treatments include the coating of the surface of the film with a film-forming composition generally containing clay or other conventional paper coating compositions. In the preparation of matte-surfaced styrene polymer films, it is highly desirable that such surfaces be prepared without the addition of pigments and foreign particulate material in that any scrap generated in production may be re-cycled to produce transparent film.

It would be desirable if there were available an improved method for the preparation of alkenyl aromatic resinous film and sheet having the general appearance of paper.

It would also be beneficial if such a method were rapid and required minimal equipment.

It would further be beneficial if an improved method were available which would permit ready control of the degree of the matte finish obtained without the appearance of stress cracking in the film or sheet.

These benefits and other advantages in accordance with the present invention are achieved by providing alkenyl aromatic resinous film having a generally smooth surface, the resin of the synthetic resinous film being subject to solvent attack; that is, able to be swelled by a solvent composition, exposing said film to an azeotropic solvent vapor, the solvent vapor having a temperature sufficiently high to cause the vapor to attack the film and form a matte finish thereon, and a temperature sufficiently low that the film is not destroyed.

The method of the present invention is applicable to a wide variety of alkenyl aromatic resins. By the term "alkenyl aromatic resins" is meant a solid polymer of one or more polymerizable alkenyl aromatic compounds.

The polymer or copolymer comprises, in chemically combined form, at least 50 percent by weight of at least one alkenyl aromatic compound having the general formula

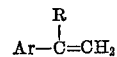

wherein Ar represents an aromatic hydrocarbon radical, or an aromatic halohydrocarbon radical of the benzene series, and R is hydrogen or the methyl radical. Examples of such alkenyl aromatic resins are the solid homopolymers of styrene, α-methylstyrene, o-methylstyrene, m-methylstyrene, p-methylstyrene, ar-ethylstyrene, ar-vinylxylene, ar-chlorostyrene or ar-bromostyrene; the solid copolymers of two or more of such alkenyl aromatic compounds with minor amounts of other readily polymerizable olefinic compounds such as methylmethacrylate, acrylonitrile, etc.

The practice of the invention is described particularly in relation to alkenyl aromatic resin, and more specifically, polystyrene, but the principle employed is applicable to other alkenyl aromatic resinous films or composite resinous films such as those prepared by simultaneous extrusion of diverse synthetic resins by a method such as is disclosed in U.S. Pats. 3,397,428 and 3,308,508, or composite films prepared by laminating pre-formed films, or composite films prepared by applying a suitable coating composition to a pre-formed film.

Oftentimes, it is advantageous to employ a film made up of layers of different polymers in order to obtain a product of the desired characteristics. For example, if the resultant product is to be soft and tear resistant, one may choose a relatively solvent-resistant material for an inner layer and thin outer layers of a material which is readily etched by low cost solvent, and the multilayer film, if the heat distortion temperature of the inner layer is substantially greater than that of the treated layer or layers, can be treated at a temperature much higher than the heat distortion temperature of the material forming the outer layer, as the material forming the outer layer is supported by the material forming the inner layer. Beneficially, in practice of the method of the present invention the actual temperature the film reaches is indeterminate, as the solvent vapor may be applied rapidly in such a manner that the film need not achieve a uniform temperature across its thickness. Thus, a surface portion and a portion immediately adjacent thereto will rise to a temperature sufficiently high to provide the desired matte surface while the remainder of the film remains at a temperature below the heat distortion temperature. Thus, the temperature of the solvent vapor which is useable depends on the rate of treatment, thickness of the film and like well known factors. Solvent compositions suitable for the practice of the method of the present invention are azeotropic vapors of monohydric alcohols containing up to 4 carbon atoms and benzene or toluene. The desirable mixtures are methyl alcohol, ethyl alcohol, n-propyl alcohol, isopropyl alcohol with toluene or benzene or mixtures thereof. The useful azeotropic mixtures with their boiling points in degrees centigrade are methyl alcohol/benzene, 58.3; ethyl alcohol/benzene, 68.2; isopropyl alcohol/benzene, 71.9; n-propyl alcohol/benzene, 77.1; methyl alcohol/toluene, 63; ethyl alcohol/toluene, 76.7; isopropyl alcohol/toluene, 81.3 and n-propyl alcohol/toluene, 92.4. Generally for polystyrene and rubber-modified polystyrene, the isopropyl alcohol/toluene azeotropic vapor under ambient atmospheric pressure is beneficial and gives rapid etching without significant tendency to cause shrinkage or stress cracking.

Application of the vapor to film or sheeting in accordance with the present invention may be accomplished by a variety of means. Beneficially, the film may be passed over a vessel containing a boiling solvent composition or passed through a vapor bath such as is commonly employed for de-greasing operations. Advantageously, by passing the film over a vapor mass, the lowermost surface may be treated, or the film may be immersed and both surfaces treated. The azeotropic vapor may be applied in the form of a planiform blast such as is obtained from a slotted tube or air doctor. Generally, it is convenient to apply the vapor to the film at atmospheric pressure. However, superatmospheric and subatmospheric pressure may also be employed if the process is conducted within a suitable pressure vessel. By employing superheated solvent vapor which is superheated at generally atmospheric pressure and discharging the superheated solvent at the surface of the film to be etched, rapid treatment is usually obtained. If desired, this treatment may be repeated until the desired surface effect is observed. In general when the film has been subjected to the vapors to cause etching, deformation or whitening of the surface, it is usually desirable to remove at least a major portion of the solvent from the surface of the treated film. Removal of solvent vapor can readily be accomplished in a continuous manner by treating with a flow of gas such as air or nitrogen and advantageously a countercurrent flow. Applying the superheated vapor and maintaining the surface portion of the film above the boiling point of the solvent and applying a gas having a temperature above the boiling temperature of the solvent will provide maximum removal of the solvent. Advantageously, the process of the invention can be practiced by employing film which is supplied at ambient temperatures. Alternately, the temperature of the film prior to contact of the solvent vapors may be raised or lowered to increase or decrease the action of the solvent vapors thereon.

The following examples serve to show the application of the principles of the present invention to polystyrene film.

One side of polystyrene film is exposed to various boiling solvent vapors for varying periods of time and subsequently exposed to a stream of air. The results are set forth in the following table.

with the azeotropic vapors of the hereinbefore delineated mixtures.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:
1. A method for providing an alkenyl aromatic resinous film with a matte surface, the steps of the method comprising
   providing a synthetic resinous film having a generally smooth surface, the film being subject to solvent attack,
   exposing said film to an azeotropic solvent vapor which is an azeotrope of a monohydric alcohol containing up to 4 carbon atoms and benzene or toluene and mixtures thereof, the solvent vapor having a temperature sufficiently high to cause the vapor to attack the film and form a matte finish thereon and a temperature sufficiently low that the film is not destroyed.
2. The method of claim 1 wherein the film is continuously moved relative to the solvent vapor.
3. The method of claim 1 wherein the vapor is at about the boiling point of the solvent.
4. The method of claim 1 wherein the vapor is superheated.
5. The method of claim 1 wherein the film is a multilayer film.
6. A method for providing a matte surface from alkenyl aromatic resinuous film, the steps of the method comprising
   providing an alkenyl aromatic resinous film having a generally smooth surface,
   exposing the smooth surface of said alkenyl aromatic film to a solvent vapor in the form of a generally

TABLE

| Solvent vapor | Boiling point, °C. | Exposure time, seconds | Appearance |
|---|---|---|---|
| 79 parts by weight isopropyl alcohol 21 parts toluene. | 81.3 | 2 | Cloudy. |
| | | 3 | Milk white; obscures print viewed through film when print is spaced ½ inch; print can be read when in contact with the film. |
| | | 5 | White; no gloss; print illegible but detectable ¼ inch behind film. |
| | | 10 | White flat finish: print illegible ⅛ inch behind film; no gloss. |
| Normal propanol | 97.8 | 10 | Slight matting; milky translucent. |
| | | 30 | White textured matte surface; silghtly translucent. |
| 1:1 normal propanol and isopropyl alcohol by volume. | | 30 | Equivalent to 10 seconds of normal propanol exposure. |
| 69 parts by weight methanol, 31 parts by weight toluene. | 63.8 | 3 | Cloudy. |
| | | 4 | Milk white; obscures print viewed through film when print is spaced ½ inch; print can be read when in contact with the film. |
| | | 6 | White; no gloss; print illegible but detectable ¼ inch behind film. |
| | | 10 | White flat finish; print illegible ⅛ inch behind film; no gloss. |

Microscopic examination of the surfaces of the treated film indicates no stress cracking and a pattern of microscopic pits.

Results commensurate with the foregoing example are obtained when the polystyrene film is replaced with a laminate having surface layers of polystyrene and a central or inner layer of oriented polypropylene. Generally similar and commensurate results are also obtained when polystyrene and alkenyl aromatic polymer films are treated planiform blast, the solvent vapor being the azeotrope vapor of a monohydric alcohol containing up to 4 carbon atoms and benzene or toluene and mixtures thereof,
exposing the film to the solvent vapor for a period of time sufficient that the solvent vapor swells the film, subsequently
removing the solvent vapor by means of a stream of gas.

7. The method of claim 6 wherein the alkenyl aromatic resinous film is polystyrene.

8. The method of claim 6 wherein the gas is air.

References Cited

UNITED STATES PATENTS

| | | | |
|---|---|---|---|
| 2,304,632 | 12/1942 | Faelfen | 264—341 |
| 2,305,859 | 12/1942 | Freund | 264—343 |
| 2,312,623 | 3/1943 | Brooks | 264—343 |
| 2,360,650 | 10/1944 | Crane | 264—343 |
| 2,782,697 | 2/1957 | Krupa | 264—83 |
| 3,234,313 | 2/1966 | Miller et al. | 264—230 |
| 3,327,033 | 6/1967 | Koch et al. | 264—83 |
| 3,551,538 | 12/1970 | Yamamoto et al. | 264—343 |

FOREIGN PATENTS

| | | | |
|---|---|---|---|
| 1,508,903 | 1/1968 | France | 264—343 |

JAY H. WOO, Primary Examiner

U.S. Cl. X.R.

8—130.1; 156—2; 161—6; 264—343